(12) United States Patent
Grundtvig

(10) Patent No.: US 7,762,382 B2
(45) Date of Patent: Jul. 27, 2010

(54) METHOD AND A SYSTEM FOR TRANSFERRING OF ITEMS

(75) Inventor: Henrik Grundtvig, Risskov (DK)

(73) Assignee: Scanvaegt International A/S, Aarhus N (DK)

( * ) Notice: Subject to any disclaimer, the term of this patent is extended or adjusted under 35 U.S.C. 154(b) by 0 days.

(21) Appl. No.: 12/160,152

(22) PCT Filed: Jan. 9, 2007

(86) PCT No.: PCT/DK2007/000012

§ 371 (c)(1),
(2), (4) Date: Jul. 7, 2008

(87) PCT Pub. No.: WO2007/079751

PCT Pub. Date: Jul. 19, 2007

(65) Prior Publication Data

US 2009/0129910 A1 May 21, 2009

(30) Foreign Application Priority Data

Jan. 9, 2006 (DK) .................. PA 2006 00035

(51) Int. Cl.
*B65G 47/34* (2006.01)

(52) U.S. Cl. .................. 198/382; 198/468.2; 198/468.4

(58) Field of Classification Search ............. 198/346.2, 198/376, 382, 463.2, 464.1, 464.2, 468.2, 198/468.4, 470.1, 471.1, 617
See application file for complete search history.

(56) References Cited

U.S. PATENT DOCUMENTS

| | | | | |
|---|---|---|---|---|
| 2,642,173 A * | 6/1953 | Wehmiller et al. | .......... | 198/367 |
| 3,903,563 A * | 9/1975 | Casey et al. | ............ | 15/304 |
| 4,815,580 A * | 3/1989 | Schanz et al. | ............ | 198/347.1 |
| 5,372,238 A * | 12/1994 | Bonnet | .................. | 198/455 |
| 5,381,884 A * | 1/1995 | Spatafora et al. | ............ | 198/433 |
| 5,921,375 A | 7/1999 | van Laar | | |
| 6,843,359 B2 * | 1/2005 | Ballestrazzi et al. | ..... | 198/418.6 |
| 7,070,039 B2 * | 7/2006 | Dombek | .................. | 198/432 |
| 7,220,094 B2 * | 5/2007 | Cerutti et al. | ............ | 414/798.5 |

(Continued)

FOREIGN PATENT DOCUMENTS

DE        3500342        7/1966

(Continued)

OTHER PUBLICATIONS

International Search Report dated Mar. 19, 2007.

*Primary Examiner*—Douglas A Hess
(74) *Attorney, Agent, or Firm*—Pearne & Gordon LLP

(57) ABSTRACT

Method and system for transferring items (2) from an inlet flow or a bulk of items at a first area to a second area, from which the items are transferred in an orderly flow of items,
whereby a plurality of gripping means (18) are used for transferring said items and
whereby said method comprises the steps of
moving at least one of said plurality of gripping means (18) towards at least part of said first area or vice versa,
engaging one of said items by said at least one of said plurality of gripping means (18),
moving said engaged item away from said first area, or vice versa,
placing said engaged item at a selected position, and whereby
said item is moved away from said second area in an orderly flow with at least one further item handled by another of said plurality of gripping means.

35 Claims, 10 Drawing Sheets

Figure 1:
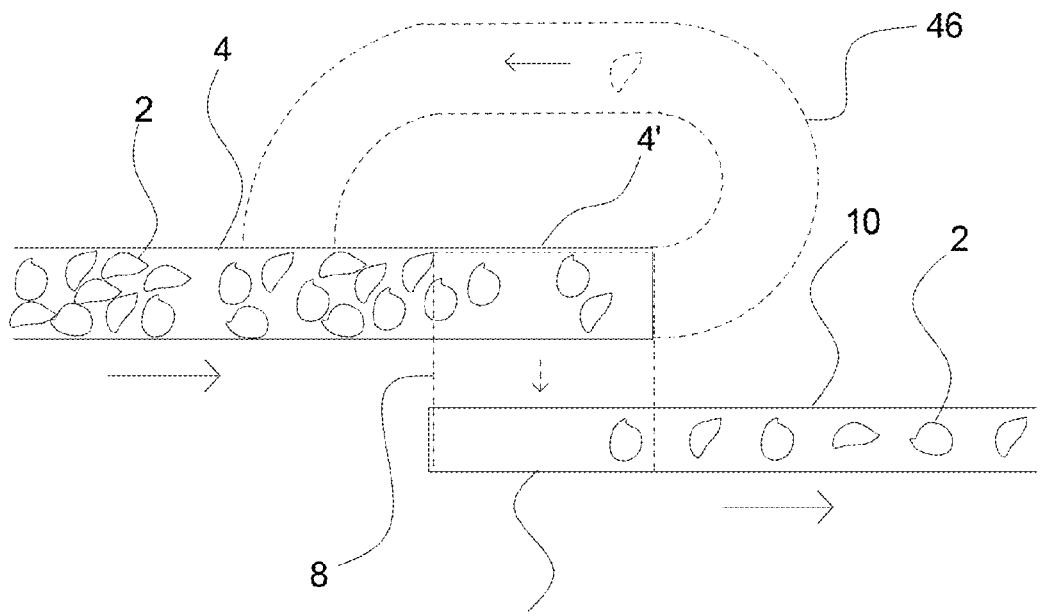

U.S. PATENT DOCUMENTS 7,364,029 B2 * 4/2008 Seidel ................ 198/376

FOREIGN PATENT DOCUMENTS

| EP | 0619249 | A1 | 10/1994 |
|---|---|---|---|
| EP | 1021361 | B1 | 3/2003 |
| EP | 1477439 | | 11/2004 |
| EP | 1484142 | A1 | 12/2004 |
| EP | 1754661 | A1 | 2/2007 |
| FR | 2724644 | | 3/1996 |
| NL | 9102028 | | 7/1993 |
| WO | 9906281 | | 2/1999 |
| WO | 2005035405 | A1 | 4/2005 |

* cited by examiner

METHOD AND A SYSTEM FOR TRANSFERRING OF ITEMS

FIELD OF THE INVENTION

The invention relates to a method for transferring of items individually from an inlet flow or a bulk of items at a first location to a second location, said method comprising the step of delivering the items in an orderly form at the second location.

The invention also relates to a system for transferring of items individually from an inlet flow or a bulk of items at a first location to a second location, said system being adapted for delivering the items in an orderly form at the second location.

BACKGROUND OF THE INVENTION

In connection with transport, handling, processing etc. of various items including food items such as pieces of meat, fish, pieces of poultry etc., it is desired to be able to grip and move or transport such pieces further on one by one. In particular this will be the case when such items are delivered in an un-orderly form, possibly with a plurality of items being accumulated or piled up, and similarly, when it is of importance, for example in consideration of a further processing of the items, that the items are transported further on with a certain minimum distance between the items.

It is known to use various forms of vacuum transport devices in such instances.

Such devices are disclosed for example in EP 619249 A1, EP 1021361 B, NL 9102028 og WO 2005/035405 A1. These prior art devices all have an external suction pump or the like, from which vacuum is led to the devices. Such vacuum devices require frequent cleaning, when used for transporting food stuff or the like, which may be troublesome and may demand considerable resources, if a satisfactory result is to be achieved.

Further, these prior art devices are characterized in having the lifting means arranged in a static configuration. EP 619249 A1 and EP 1021361 B describe the lifting means being mounted in a horizontal wheel configuration, meaning that the individual lifting means are moved circularly in a horizontal plane. NL 9102028 and WO 2005/035405 A1 describe the lifting means being mounted in a drum- or wheel-shaped arrangement, which on its surface is provided with suction holes, by means of which items may be gripped and moved one by one.

Furthermore, various mechanisms are used at these prior art devices in order to ensure that vacuum is connected at the right time and that vacuum is disconnected at the right time in order to release the items. Such mechanisms may add to the complexity of the design and may furthermore hinder or make an efficient cleaning difficult.

Furthermore, vacuum devices are known, which are used for lifting individual items without using external vacuum sources.

For example, EP 1 484 142 A1 describes a vacuum lifting device, where a piston can be moved downwards in a cylinder by means of compressed air and where the piston can be moved upwards by means of a spring. The cylinder has at its lower end a channel, which leads to a suction disc. This prior art lifting device is used by removing the pressure, i.e. the compressed air, whereby the spring will lift the piston upwards, thus resulting in a vacuum being produced in the cylinder, whereby an item such as an optical lens can be withheld to the suction disc.

A similar lifting device is known from EP 1 477 439 A1, where, though, the piston can also be forced downwards against the spring force by means of an electromagnet.

Both of these prior art lifting devices are adapted for lifting solid, mechanical stable items and thus a predetermined piston stroke is used in order to produce a vacuum having a predetermined value. Furthermore, both of these devices are designed in such a manner that apparently there is no possibility of separating cylinder and piston, meaning that it is not an option to use such devices for applications, where the hygienic condition has to be considered.

It is a further common characteristic for the abovementioned prior art devices that the number of items that may be gripped and moved, is limited, thus meaning that these prior art devices are insufficient when it is desired to move a plurality of items with a desired velocity, corresponding to the velocity, by which such items are transported in for example the field of foodstuff processing.

Still further, devices are known for moving a relatively large number of items simultaneously, for example glass items or the like, which in advance have been placed in an orderly form, for example placed in one or more rows, where a shared carrier has a corresponding large number of suction means arranged in a corresponding manner, and where the suction means all are connected to a shared vacuum source. It is obvious that such a device is not suitable for moving items individually, but for moving a relatively large number of items simultaneously, which items have to be placed in an orderly form in advance. Furthermore, the device is not designed to be able to deliver the items at different points in time, since the items are released all at the same time.

Thus, it is an object of the invention to provide a method and a system for transferring items individually, which provide an improvement in relation to the prior art and without the abovementioned drawbacks.

Furthermore, it is an object of the invention to provide such a method and such a system for gripping items one by one from an un-orderly flow or bulk and moving these to another flow, where the items are delivered. A particular object is to provide such a method and such a system, where vacuum is used for lifting the items. A further particular object is to provide such a method and such a system where the use of an external vacuum source may be avoided.

A still further object is to provide such a method and such a system, which are flexible.

Another object is to provide such a method and such a system, by means of which an enhanced capacity may be achieved in relation to the prior art, and by means of which a transfer speed may be achieved corresponding to the process speed currently used in the field of food processing, even when a large number of items are handled, thus achieving that such a method and such a system may efficiently be used in such applications and that the method and the system may readily be adapted for handling the number of items that are actually being fed.

A still further object is to provide such a method and such a system, where cleaning may expediently and efficiently be taken care of.

It is also an object to provide such a method and such a system, which is designed for use in connection with items, e.g. food items or the like, which not necessarily are provided with a stable or firm form and/or structure.

These and other objects are achieved by the invention as it will be explained in the following.

SUMMARY OF THE INVENTION

The invention relates to a method of transferring items from an inlet flow or a bulk of items at a first area to a second area, from which the items are transferred in an orderly flow of items,
   whereby a plurality of gripping means are used for transferring said items and
   whereby said method comprises the steps of
   moving at least one of said plurality of gripping means towards at least part of said first area or vice versa,
   engaging one of said items by said at least one of said plurality of gripping means,
   moving said engaged item away from said first area, or vice versa,
   placing said engaged item at a selected position, and whereby
   said item is moved away from said second area in an orderly flow with at least one further item handled by another of said plurality of gripping means.

Hereby, it is achieved that the items can be transferred to the second area in a flexible manner, in particular since the items can be placed within the second area for example in consideration of items that already have been placed or in consideration of one or more items that essentially simultaneously is/are being transferred by means of another gripping means. Thus, in addition to the enhanced flexibility, the transference speed, i.e. the speed with which a certain number of items can be transferred with, can be increased in this manner, since the use of a plurality of gripping means is facilitated while simultaneously ensuring that the items can be placed at the second area in the desired manner, for example with a desired minimum distance to each other, and thus that the items can transported further on in an orderly flow in the desired manner.

Preferably, said step of placing said engaged item at a selected position may comprise releasing said engaged item from said at least one of said plurality of gripping means.

Hereby, the item can be placed in an expedient manner.

Further, said engaged item may be released at said selected position, whereby the item is placed at the desired position in a particular expedient manner.

Advantageously, said engaged item may be released from said at least one of said plurality of gripping means and subsequently placed at said selected position using further means, whereby the item can be placed at the selected position in an expedient manner, for example in cases, where the gripping means is of a type, where the item is not automatically e.g. dropped when it is released. In such a case further means such as e.g. a rod or the like may be used for placing the item.

Preferably, said engaged item may be released and/or placed at a selected position at said second area.

According to an alternative embodiment, said engaged item may be released and/or placed at a selected position at intermediate means and transferred to said second area in a subsequent step, and preferably, said item may be transferred to said second area in said subsequent step together with other released and/or placed items.

Hereby, it is achieved that the items can be released from the gripping means and placed in an orderly form without having to take into account the fact that e.g. a conveyor belt, on which the second area is located, is moving. When the items subsequently are moved from the intermediate means to e.g. the conveyor belt, this may be done in a manner ensuring that the orderly form in which the items are placed, are not distorted or destroyed. The intermediate means may for example be a platform, a carriage or the like, which may be pushed under the items engaged by the gripping means immediately before the items(s) is(are) released, or the gripping means may be relocated to be placed above such intermediate means before the items(s) is(are) released. Other manners of arranging the interrelated movements are possible, which will be apparent to a skilled person.

According to a preferred embodiment, said step of releasing and/or placing said engaged item at a selected position may comprise locating said item at a position selected among a number of predetermined positions.

Hereby, it is achieved that the items are placed at the second area in the desired mutual relationship in an expedient manner, for example when a plurality of positions are defined in advance, thereby facilitating a relatively uncomplicated control procedure for the involved plurality of gripping means. It is noted that the predetermined positions may be positions determined in relation to the boundaries of the operative area for the gripping means, i.e. the area, within which the gripping means may operate in combination, or the positions may be determined in relation to the second area itself, if these differ.

According to another preferred embodiment, said step of releasing and/or placing said engaged item at a selected position may comprise locating said item at a position selected in relation to already located items and/or in relation to positions for other items being transferred.

Hereby, it is achieved that the items are placed at the second area in the desired mutual relationship in an expedient manner and whereby further flexibility is added, since the items may be placed in accordance with a dynamic control procedure, for example taking into consideration control parameters or signals relating to other gripping means that have released items previously or that will release items after the concerned gripping means.

Advantageously, said plurality of gripping means may be controlled by central control means, thus providing e.g. an overall control of the plurality of gripping means and whereby the control may take into consideration parameters already available at the central control, such as conveyor belt speed(s), item feeding capacity, control signals and parameters relating to the individual gripping means, etc.

Preferably, said plurality of gripping means may be adapted for, each or in combination, controllably locating items at a predefined area constituting said second area.

Hereby, further flexibility in designing and arranging the method and/or a system operating in accordance with the invention is achieved since the gripping means may be adapted in various manners. For example, it will not be necessary to use a gripping means being able to reach over the entire area of the second area as long as the gripping means are arranged to be able in total to deliver items to this area. Thus, the method and the system may be operative using relatively inexpensive gripping means while still providing a method and a system being fully capable of meeting the demands of the user.

According to an expedient embodiment, said at least one of said plurality of gripping means being moved towards said first area, or vice versa, may be adapted for engaging an item located within a predefined area constituting said first area.

Hereby, a further advantage is achieved since the demands as regards the accuracy of the gripping means when engaging an item is lessened and further since the pick-up speed of the plurality of gripping means in combination is increased considerably, as a plurality of gripping means may engage items simultaneously at the first area thereby also facilitating an enhanced operational speed.

According to an advantageous embodiment, said plurality of gripping means may engage and hold said items by suction, e.g. during application of vacuum.

Hereby, it is achieved that said gripping means may operate in a manner whereby items may be engaged in a straightforward manner, for example by moving the gripping means down towards the items until the suction opening meets an item, where after the item will automatically be withheld by the gripping means. Thus, it may not be necessary to move the gripping means towards a specific item, and in particular when the items and the gripping means are moving in relation to each other, an item will eventually contact the gripping means, thus again meaning that no particular steps need to be taken in order to grip an item using a suction gripping means. Furthermore, when using vacuum for gripping items, no special requirements are necessary for gripping the items, even when the items are characteristically shaped, e.g. oblong, which otherwise might cause difficulties with other types of gripping means, for example gripping means that grip around the items.

According to another advantageous embodiment, said plurality of gripping means may engage and hold said items by mechanical means, e.g. mechanical lifting, mechanical gripping, pinching or the like.

Hereby, it is achieved that further additional advantages may be achieved and that in various applications a more cost-efficient set-up may be achieved, since suction pumps, tube connections, valve controls etc. may be avoided. Further, since the use of mechanical means may require the use of detection means, e.g. a vision system or the like in order to detect the actual location of the items, this may further be taken advantage of for example in order to detect the orientation of the items which may increase the accuracy with which the items are gripped, but further allows the items to be placed at the second location with a desired orientation, e.g. by turning the gripping means correspondingly before releasing the items.

According to a further advantageous embodiment, said items may be delivered to said first area by transport means, for example a conveyor belt, and whereby said items are moving at said first area.

Hereby, the items will be delivered to the first area in an efficient and relatively simple manner and further it is achieved that the items will readily be moved across the first area, whereby the contact between the gripping means and the items may be effected in a simple manner, thus meaning that for example a suction gripping means need only be lowered to a predefined level above the conveyor belt, where it can remain until it contacts an item, which eventually will happen. It will be understood, though, that the gripping means may be moving as well, both in the vertical as well as in the horizontal direction while waiting for e.g. a contact with an item to happen.

According to a particular advantageous embodiment, an item that is not engaged by one of said plurality of gripping means when passing said first area, may be returned to said transport means that delivers items to said first area.

Hereby, an increased efficiency and handling speed may be achieved, since it will not be necessary to arrange the method in order to achieve that all items have been gripped at the end of the first area, which otherwise might have the effect that conveyor speed would be kept below a conservative limit, the number of gripping means would have to be relatively high, etc. which would give a slow and expensive process method, all due to the need to ensure that all items would be gripped. When providing for a recirculation, the process features can be optimized in order to enhance speed and reduce the costs.

Expediently, said items may be moved at said first location by transport means forming part of a transport loop.

Hereby, a recirculation of the items not gripped can be arranged in a relatively simple and cost-efficient manner, e.g. using readily available transport means, conveyor belts etc.

Advantageously, said items delivered to said second area may be transported further on by means of transport means such as a conveyor belt.

Hereby, the items placed at the second location in the orderly form may expediently be transported further on for processing, further handling etc.

According to a further advantageous embodiment, said items being delivered to said second area may be delivered directly to said transport means for further transport, e.g. a conveyor belt.

Hereby, a particular simple manner of providing a further transport of the items is achieved, while simultaneously providing a means, on which said second area can be defined.

The invention further relates to a system for transferring items from an inlet flow or a bulk of items at a first area to a second area, said system being adapted for transferring an orderly flow of items from said second area, said system comprising a plurality of gripping means adapted for transferring said items, first location means for supporting items at said first area and second location means for supporting items at said second area, wherein the system is adapted for moving at least one of said plurality of gripping means towards at least part of said first area or vice versa, engaging one of said items by said at least one of said plurality of gripping means, moving said engaged item away from said first area, or vice versa, placing said engaged item at a selected position, and whereby said item is moved away from said second area in an orderly flow with at least one further item handled by another of said plurality of gripping means.

Hereby, it is achieved that the items can be transferred to the second area in a flexible manner, in particular since the items can be placed within the second area for example in consideration of items that already have been placed or in consideration of one or more items that essentially simultaneously is/are being transferred by means of another gripping means. Thus, in addition to the enhanced flexibility, the transference speed, i.e. the speed with which a certain number of items can be transferred, may be increased in this manner, since the use of a plurality of gripping means is facilitated while simultaneously ensuring that the items can be placed at the second area in the desired manner, for example with a desired minimum distance to each other, and thus that the items can be transported further on in the second flow in the desired manner.

Preferably, said system may be adapted for releasing said engaged item from said at least one of said plurality of gripping means when placing said engaged item at a selected position.

Hereby, the item can be placed in an expedient manner.

Further, said at least one of said plurality of gripping means may be adapted for releasing said engaged item at said selected position, whereby the item is placed directly at the desired position in a particular expedient manner.

Advantageously, said system may comprise further means for placing said engaged item at said selected position, when it has been released from said at least one of said plurality of gripping means. Hereby, the item can be placed at the selected position in an expedient manner, for example in cases, where the gripping means is of a type, where the item is not automatically e.g. dropped when it is released. In such a case further means such as e.g. a rod or the like maybe used for placing the item.

Preferably, said system may be adapted for releasing and/or placing said engaged item at a selected position at said second area.

According to an alternative embodiment, said system may be adapted for releasing and/or placing said engaged item at intermediate means and for transferring said item to said second area in a subsequent step, and preferably, said intermediate means may be adapted for supporting a plurality of items.

Hereby, it is achieved that the items can be released from the gripping means and placed in an orderly form without having to take into account the fact that e.g. a conveyor belt, on which the second area is located, is moving. When the items subsequently are moved from the intermediate means to e.g. the conveyor belt, this may be done in a manner ensuring that the orderly form in which the items are placed, are not distorted or destroyed. The intermediate means may for example be a platform, a carriage or the like, which may be pushed under the items engaged by the gripping means immediately before the items(s) is(are) released, or the gripping means may be relocated to be placed above such intermediate means before the items(s) is(are) released. Other manners of arranging the interrelated movements are possible, which will be apparent to a skilled person.

Preferably, said system may comprise means for transferring said plurality of items from said intermediate means to said second area.

According to a preferred embodiment, said second area at said second location means may comprise a number of predetermined positions and wherein said at least one of said plurality of gripping means may be adapted for selectively releasing said engaged item at said second area at a selected position among said number of predetermined positions.

Hereby, it is achieved that the items are placed at the second area in the desired mutual relationship in an expedient manner, for example when a plurality of positions are defined in advance, thereby facilitating a relatively uncomplicated control procedure for the involved plurality of gripping means. It is noted that the predetermined positions may be positions determined in relation to the boundaries of the operative area for the gripping means, i.e. the area, within which the gripping means may operate in combination, or the positions may be determined in relation to the second location itself, if these differ.

According to another preferred embodiment, said at least one of said plurality of gripping means may be adapted for selectively releasing said engaged item at said second area at a position selected in relation to items already located at said second area and/or in relation to positions for other items being transferred.

Hereby, it is achieved that the items are placed at the second area in the desired mutual relationship in an expedient manner and whereby further flexibility is added, since the items may be placed in accordance with a dynamic control procedure, for example taking into consideration control parameters or signals relating to other gripping means that have released items previously or that will release items after the concerned gripping means.

Advantageously, said system may comprise central control means for controlling said plurality of gripping means, thus providing e.g. an overall control of the plurality of gripping means and whereby the control may take into consideration parameters already available at the central control, such as conveyor belt speed(s), item feeding capacity, etc.

Preferably, said plurality of gripping means may be adapted for, each or in combination, controllably locating items at a predefined area constituting said second area at said second location means.

Hereby, further flexibility in designing and arranging the system operating in accordance with the invention is achieved since the gripping means may be adapted in various manners. For example, it will not be necessary to use a gripping means being able to reach over the entire area of the second area as long as the gripping means are arranged to be able in total to deliver items to this area. Thus, the method and the system may be operative using relatively inexpensive gripping means while still providing a method and a system being fully capable of meeting the demands of the user.

According to a further preferable embodiment, a predefined area at said first location means may constitute said first area, and wherein said at least one of said plurality of gripping means may be adapted for engaging an item located within said predefined area at said first location means.

Hereby, a further advantage is achieved since the demands as regards the accuracy of the gripping means when engaging an item is lessened and further since the pick-up speed of the plurality of gripping means in combination is increased considerably, as a plurality of gripping means may engage items simultaneously at the first area thereby also facilitating an enhanced operational speed.

Advantageously, said plurality of gripping means may comprise suction means for engaging and holding said items.

Hereby, it is achieved that said gripping means may operate in a manner whereby items may be engaged in a straightforward manner, for example by moving the gripping means down towards the items until the suction opening meets an item, where after the item will automatically be withheld by the gripping means. Thus, it may not be necessary to move the gripping means towards a specific item, and in particular when the items and the gripping means are moving in relation to each other, an item will eventually contact the gripping means, thus again meaning that no particular steps need to be taken in order to grip an item using a suction gripping means. Furthermore, when using vacuum for gripping items, no special requirements are necessary for gripping the items, even when the items are characteristically shaped, e.g. oblong, which otherwise might cause difficulties with other types of gripping means, for example gripping means that grip around the items.

According to a particular preferable embodiment, said suction means may comprise a vacuum source placed locally, e.g. in or at least one of said plurality of gripping means.

Hereby, it is achieved that it will not be necessary to have a relatively large number of tubes, pipe connections, valves and valve control means etc. situated at the system with the disadvantages that this might give such as reduced movability, increased need for cleaning etc Advantageously, said suction means may comprise a vacuum source connected to at least a plurality of said plurality of gripping means. Hereby, for example a single suction pump may be arranged in the system for providing the necessary vacuum, which thus may be provided in a reliable manner.

According to a further preferable embodiment, said plurality of gripping means may be adapted for engaging and holding said items by mechanical means, e.g. by mechanical lifting, mechanical gripping, pinching or the like.

Hereby, it is achieved that further additional advantages may be achieved and that in various applications a more cost-efficient set-up may be achieved since suction pumps, tube connections, valve controls etc. may be avoided. Further, since the use of mechanical means may require the use of detection means, e.g. a vision system or the like in order to detect the actual location of the items, this may further be taken advantage of, for example in order to detect the orientation of the items which may increase the accuracy with which the items are gripped, but further allows the items to be placed at the second location with a desired orientation, e.g. by turning the gripping means correspondingly before releasing the items.

Advantageously, said first location means may form part of inlet transport means, for example a conveyor belt, for delivering items to said first area, i.e. with said items being moved at said first area.

Hereby, the items will be delivered to the first area in an efficient and relatively simple manner and further it is achieved that the items will readily be moved across the first area, whereby the contact between the gripping means and the items may be effected in a simple manner, thus meaning that for example a suction gripping means need only be lowered to a predefined level above the conveyor belt, where it can remain until it contacts an item, which eventually will happen. It will be understood, though, that the gripping means may be moving as well, both in the vertical as well as in the horizontal direction while waiting for e.g. a contact with an item to happen.

According to a particular preferable embodiment, said system may comprise means for returning items that have not been engaged by one of said plurality of gripping means when passing said first area, to said inlet transport means, e.g. said first location means.

Hereby, an increased efficiency and handling speed may be achieved, since it will not be necessary to arrange the method in order to achieve that all items have been gripped at the end of the first area, which otherwise might have the effect that conveyor speed would be kept below a conservative limit, the number of gripping means would have to be relatively high, etc. which would give a relatively slow and relatively expensive process method, all due to the need to ensure that all items would be gripped. When providing for a recirculation, the process features can be optimized in order to enhance speed and reduce the costs.

Preferably, said first location means may comprise transport means forming part of a transport loop.

Hereby, a recirculation of the items not gripped can be arranged in a relatively simple and cost-efficient manner, e.g. using readily available transport means, conveyor belts, etc.

Advantageously, said transport means forming part of a transport loop may comprise a continuous conveyor belt, a circular conveyor belt, a rotating conveyor, a turntable or the like.

According to a still further embodiment, said system may comprise outlet transport means such as an outlet conveyor belt for transporting said transferred items further on from said second location.

Hereby, the items placed at the second location in the orderly form may be transported further on for processing, further handling etc.

According to a further preferable embodiment, said second location means for supporting items at said second area may form part of outlet transport means such as an outlet conveyor belt.

Hereby, a particular simple manner of providing a further transport of the items is achieved, while simultaneously providing a means, on which said second area can be defined.

Advantageously, at least two of said plurality of gripping means may be arranged on a gripping carrier.

Hereby, a number of further options may be provided, for example using a shared source, e.g. vacuum source for two or more gripping means, using a shared control system or the like and further the option of releasing the items in an already orderly form defined by the structure of the gripping carrier.

Preferably, said system may comprise a plurality of said gripping carriers, each carrying at least one of said plurality of gripping means.

Hereby, a further advantageous embodiment is provided, having an increased capacity.

Still further, said plurality of gripping means may be independently controllable.

Hereby, further flexibility is achieved.

THE FIGURES

Figure 2:
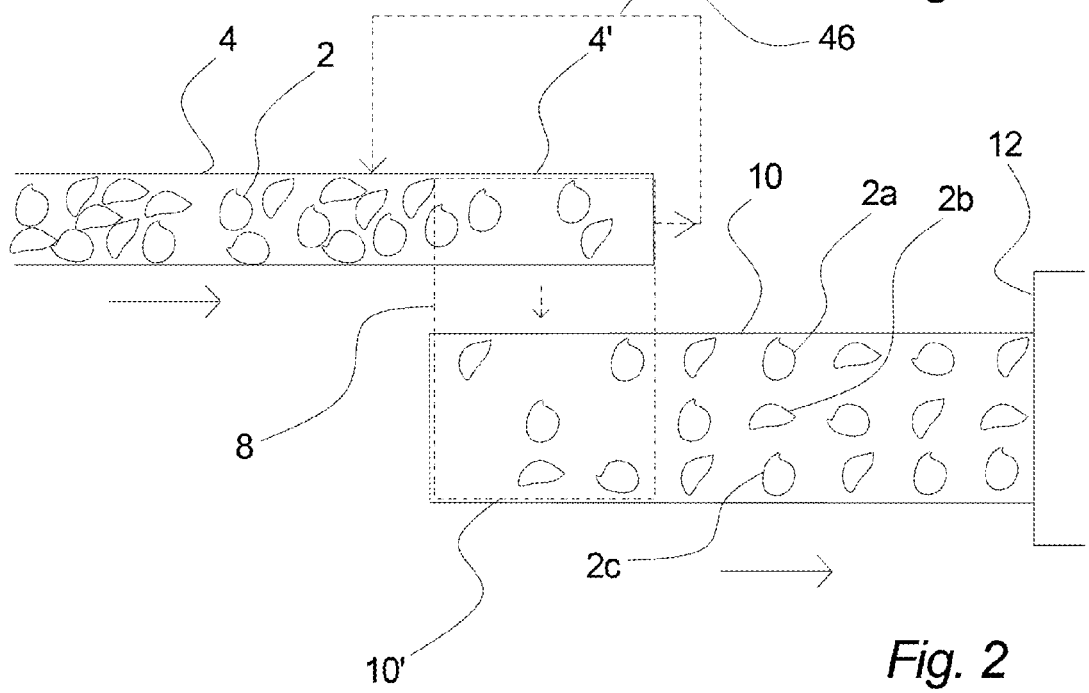
Figure 3:
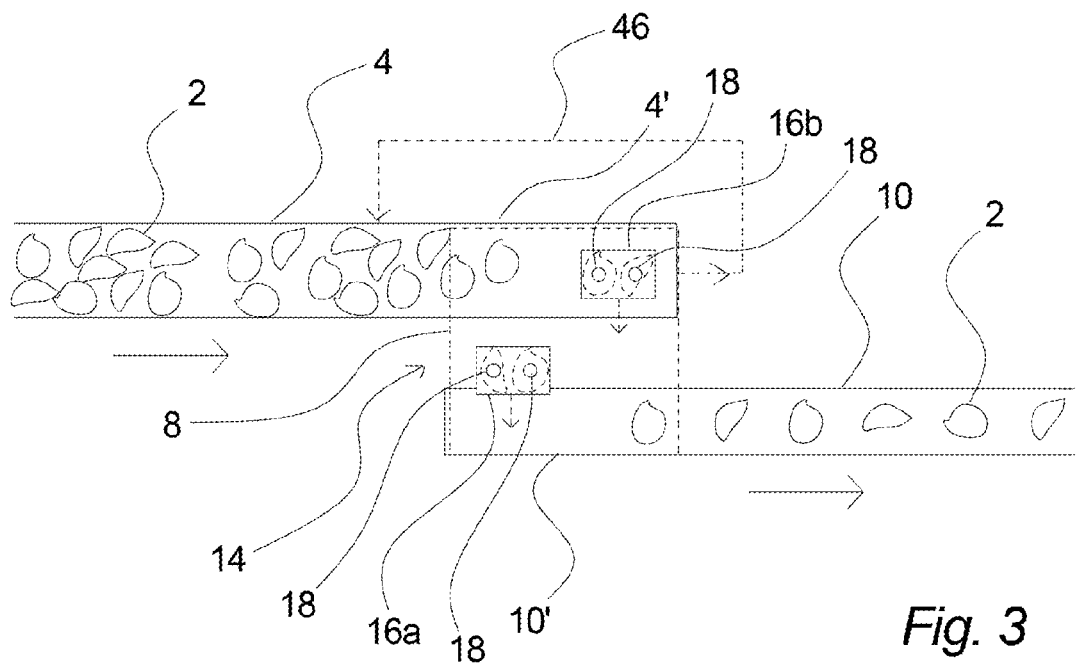
Figure 4:
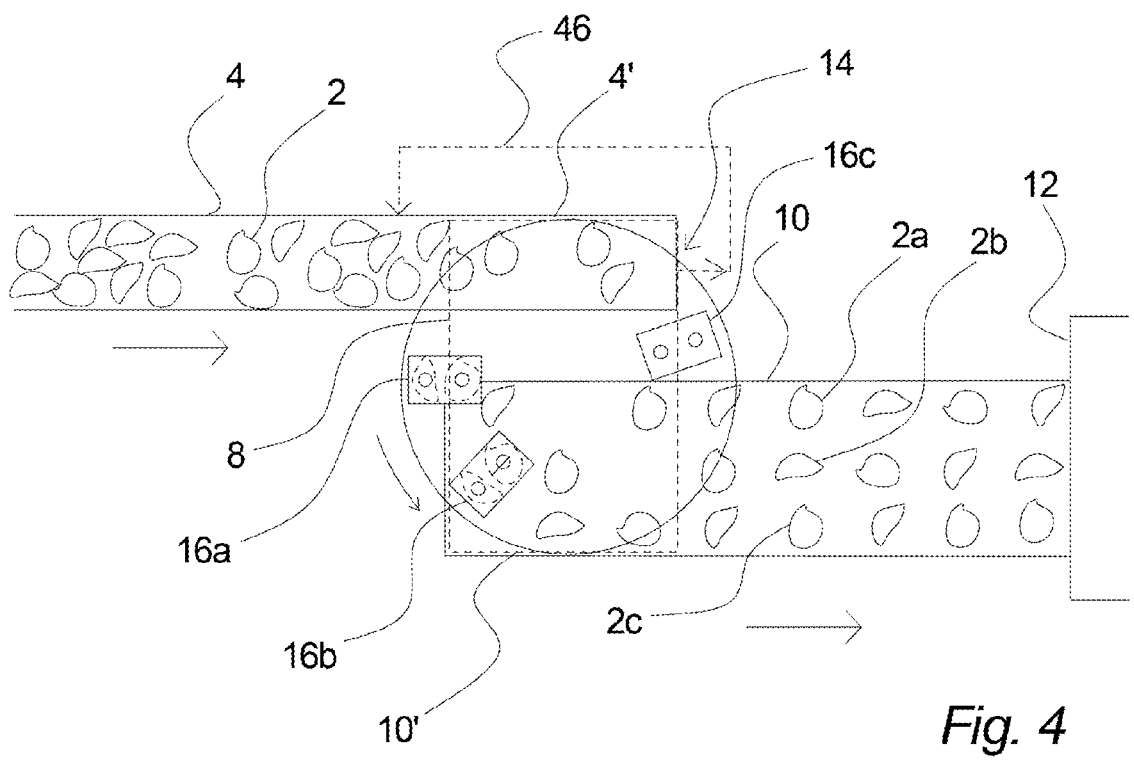
Figure 5A:
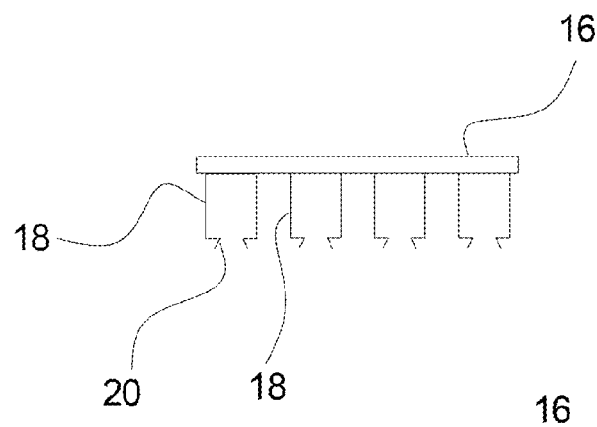
Figure 5B:
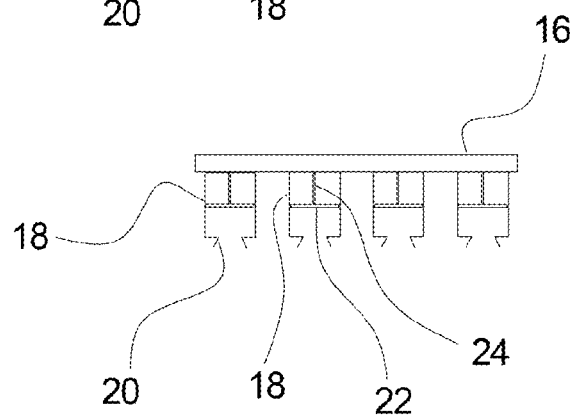
Figure 5C:
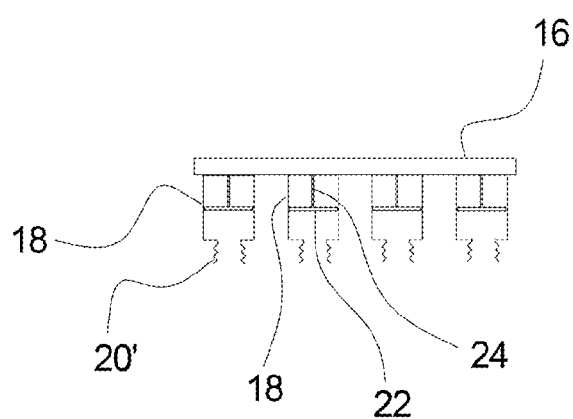
Figure 5D:
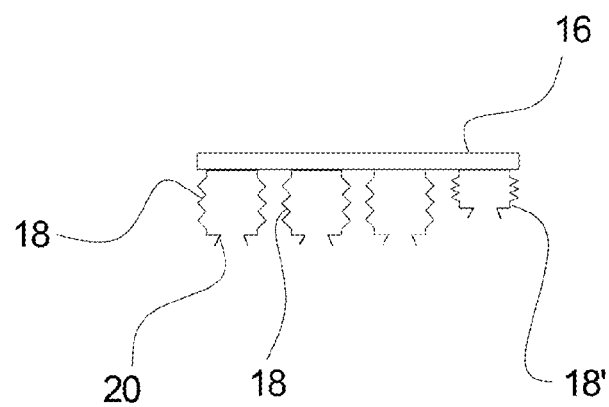
Figure 6:
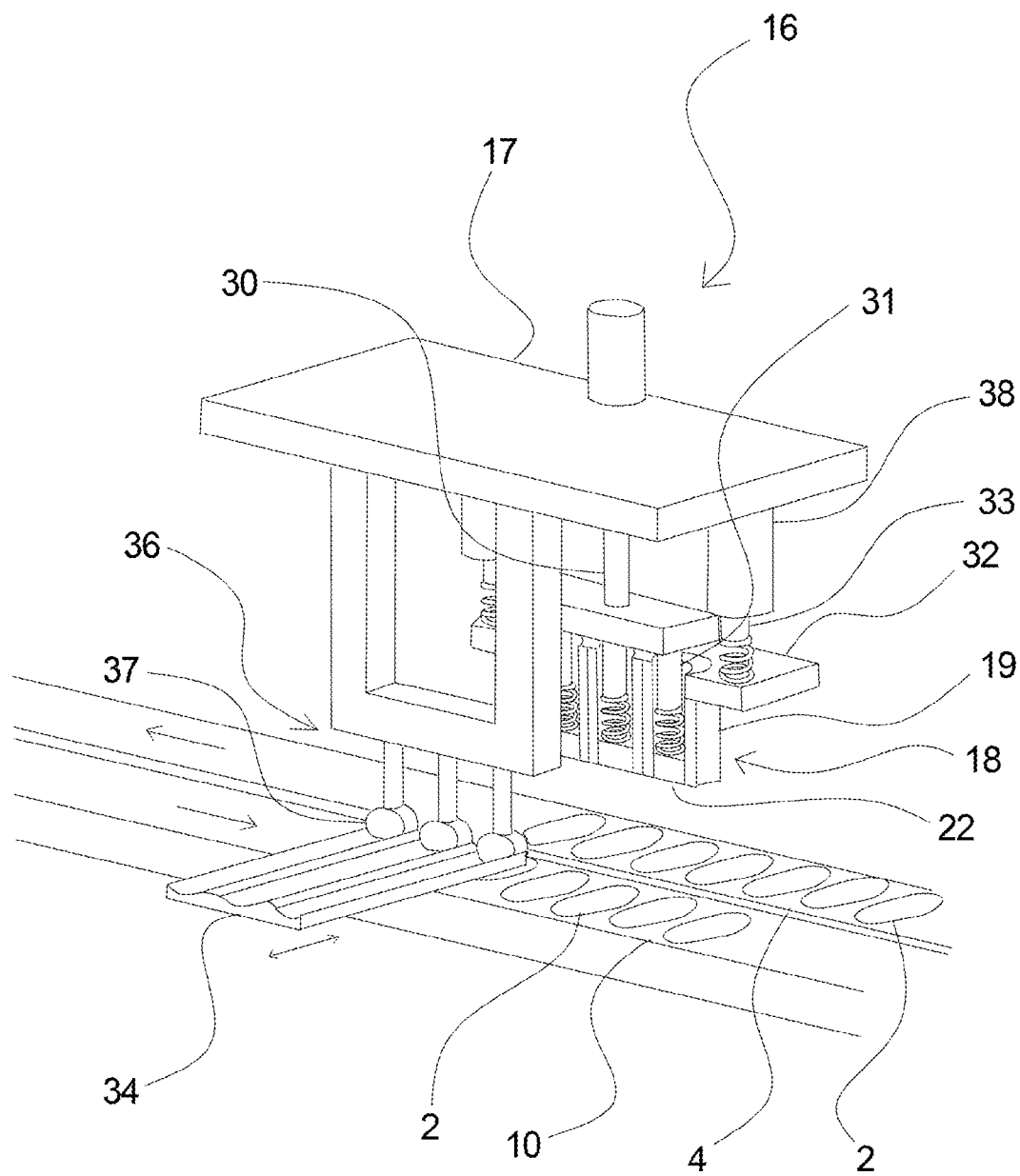
Figure 7A:
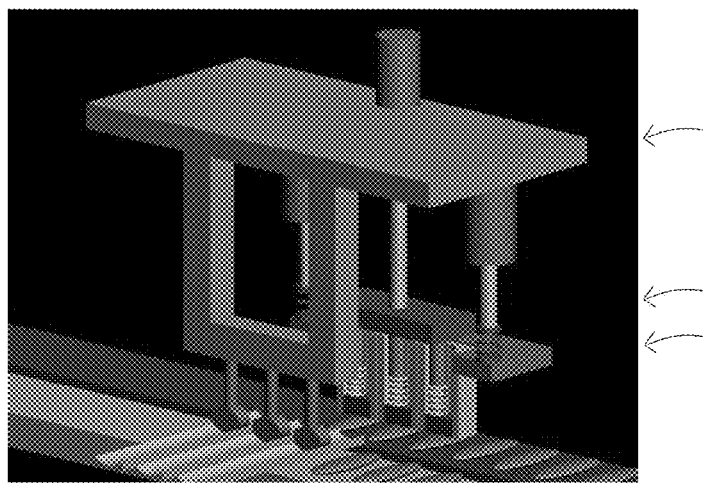
Figure 7B:
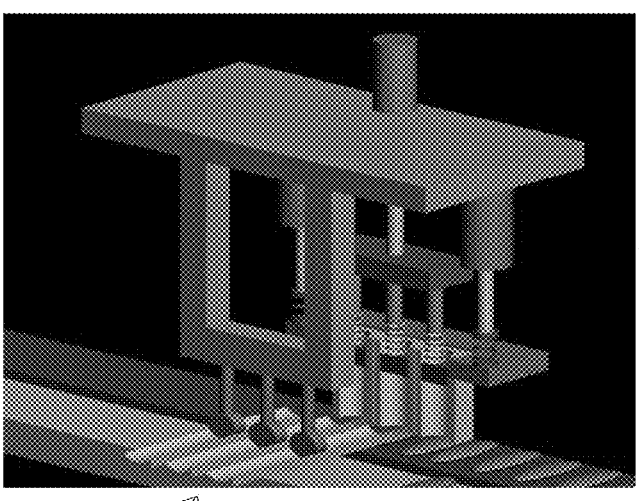
Figure 7C:
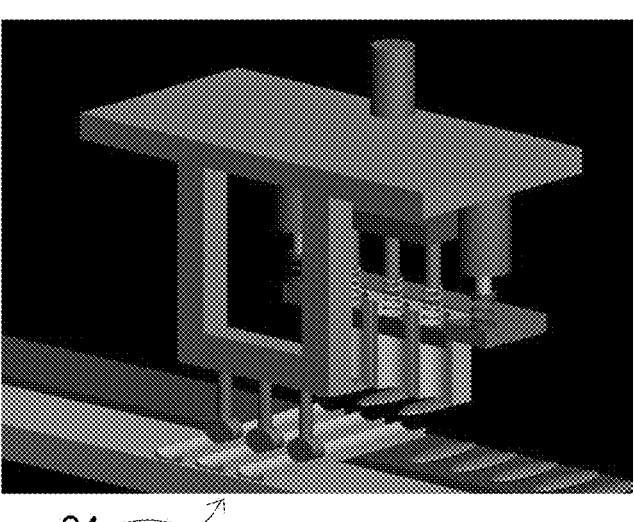
Figure 7D:
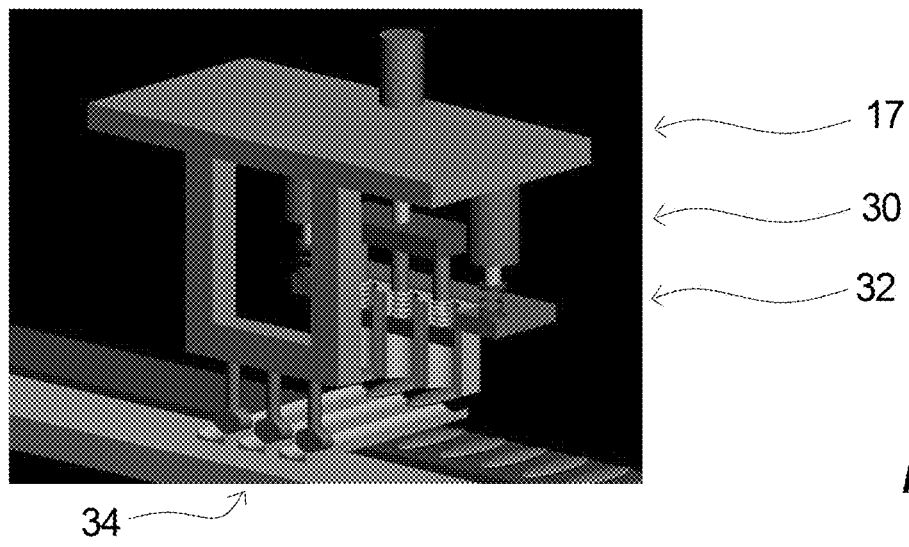
Figure 7E:
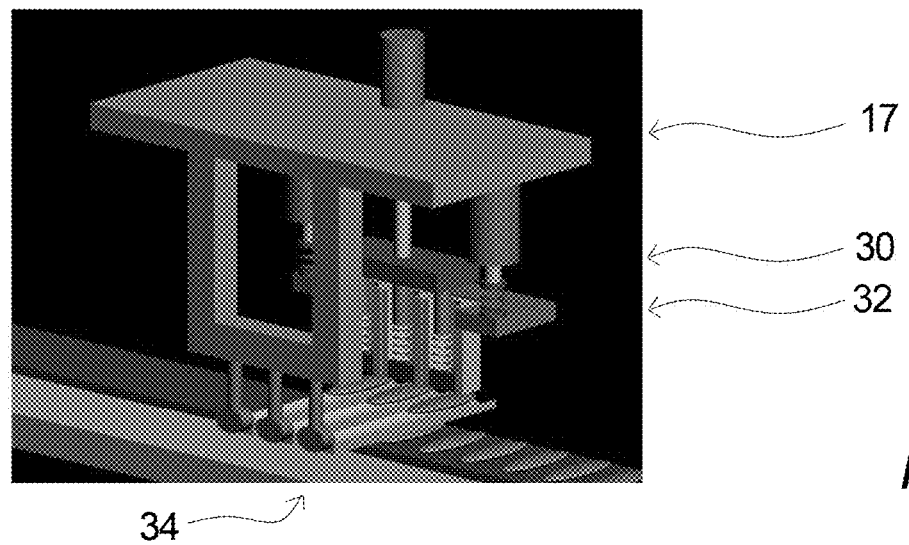
Figure 7F:
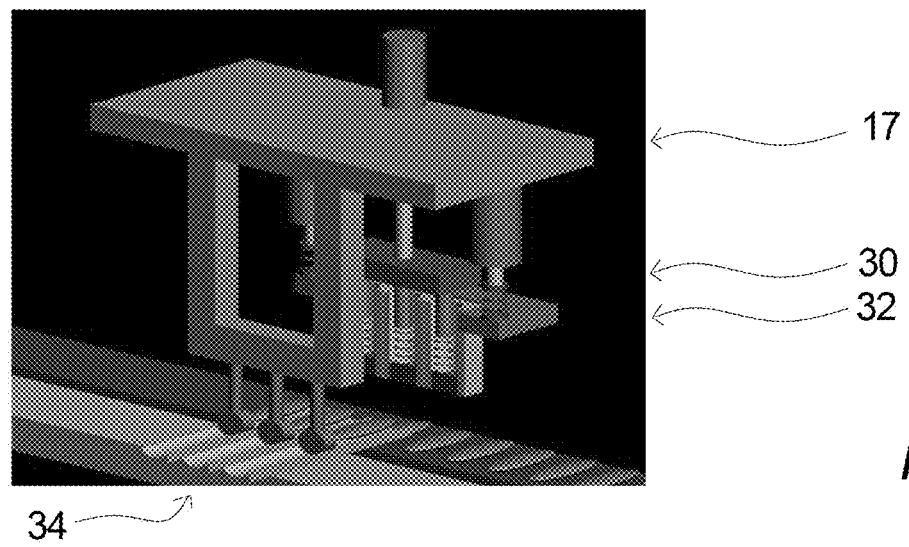
Figure 7G:
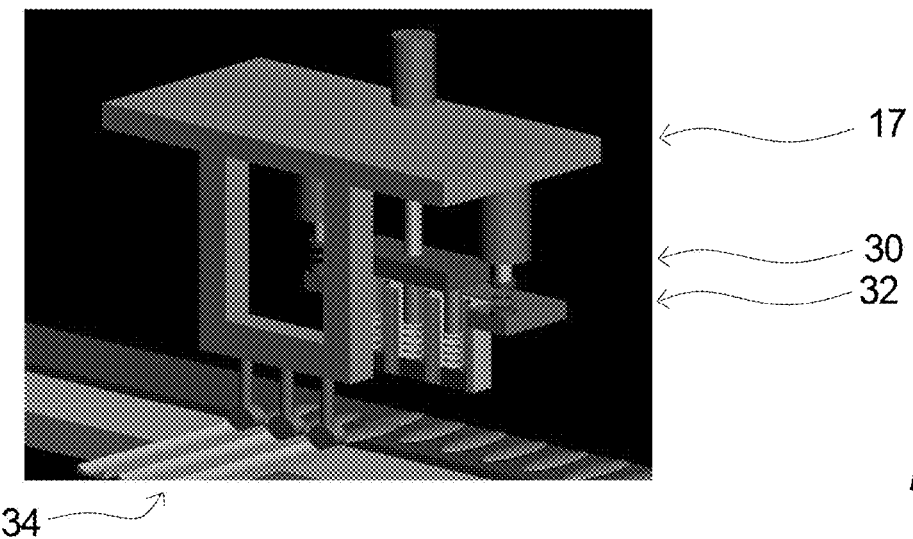
Figure 7H:
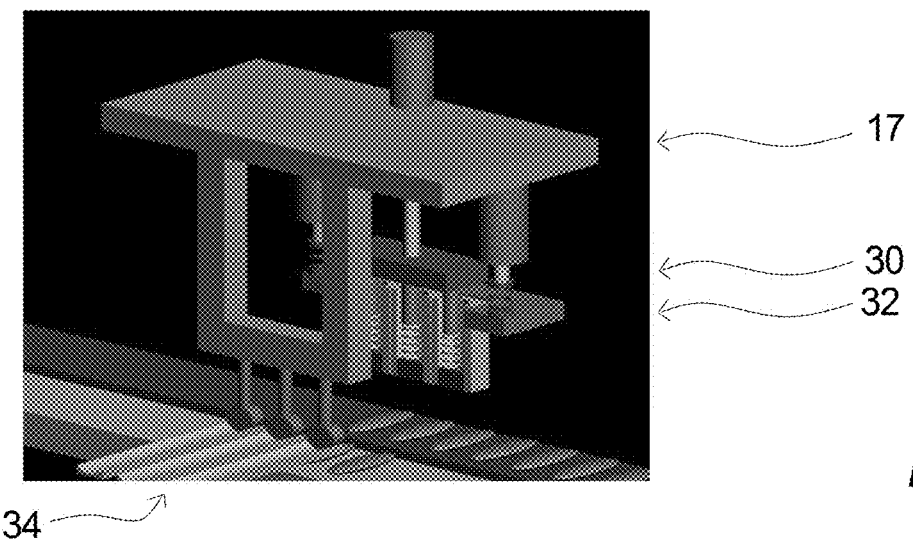
Figure 8A:
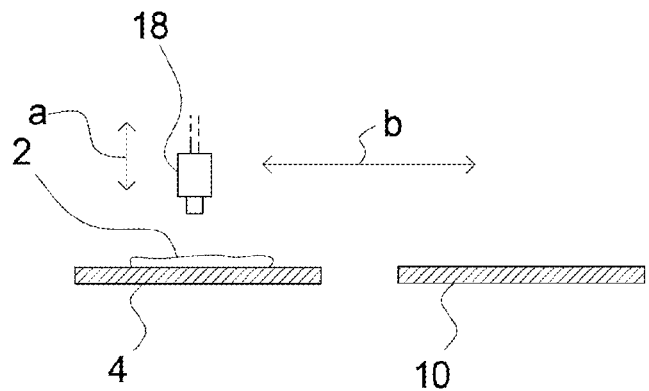
Figure 8B:
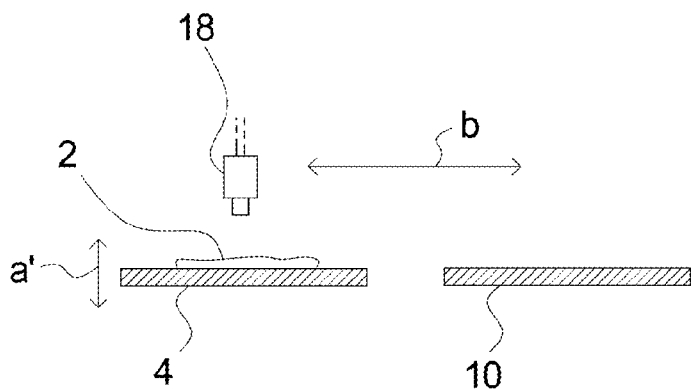
Figure 8C:
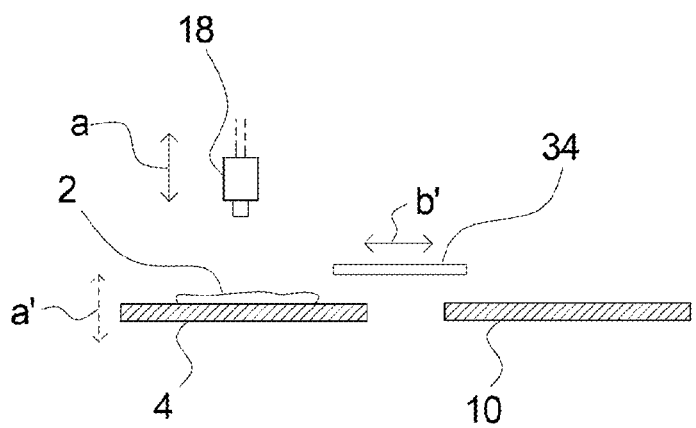
Figure 8D:
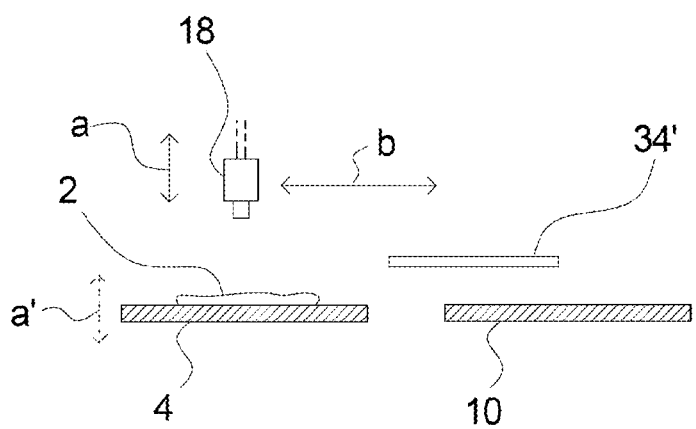
Figure 9:
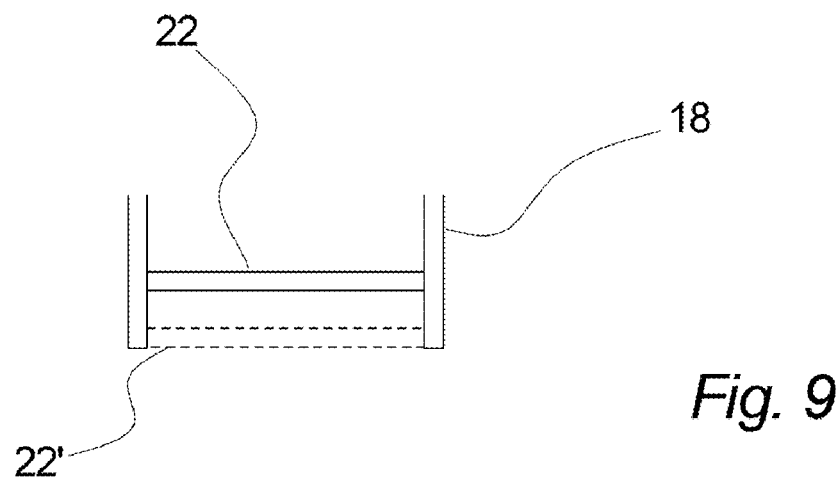
Figure 10:
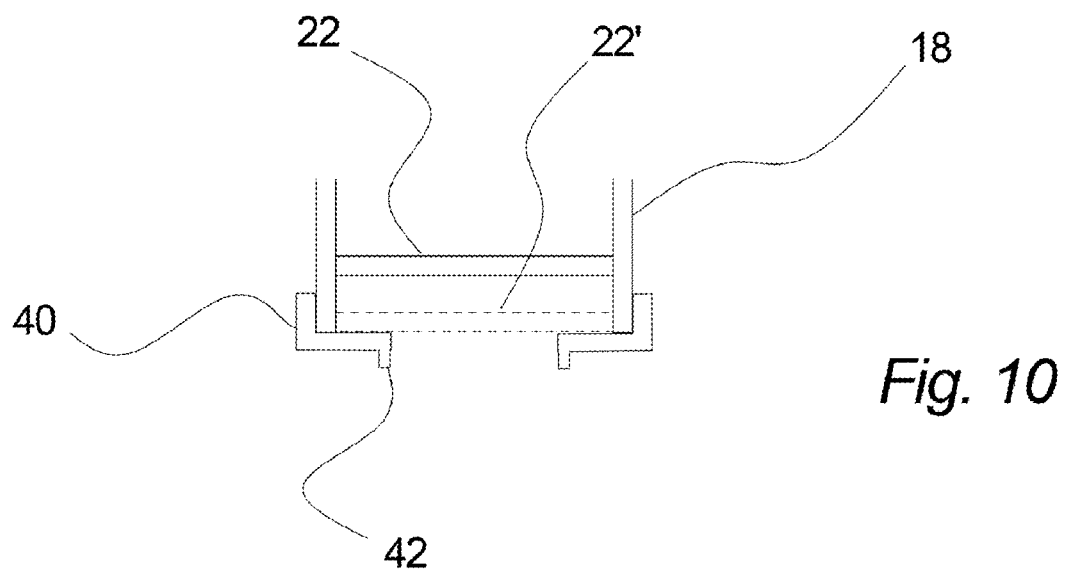
Figure 11:
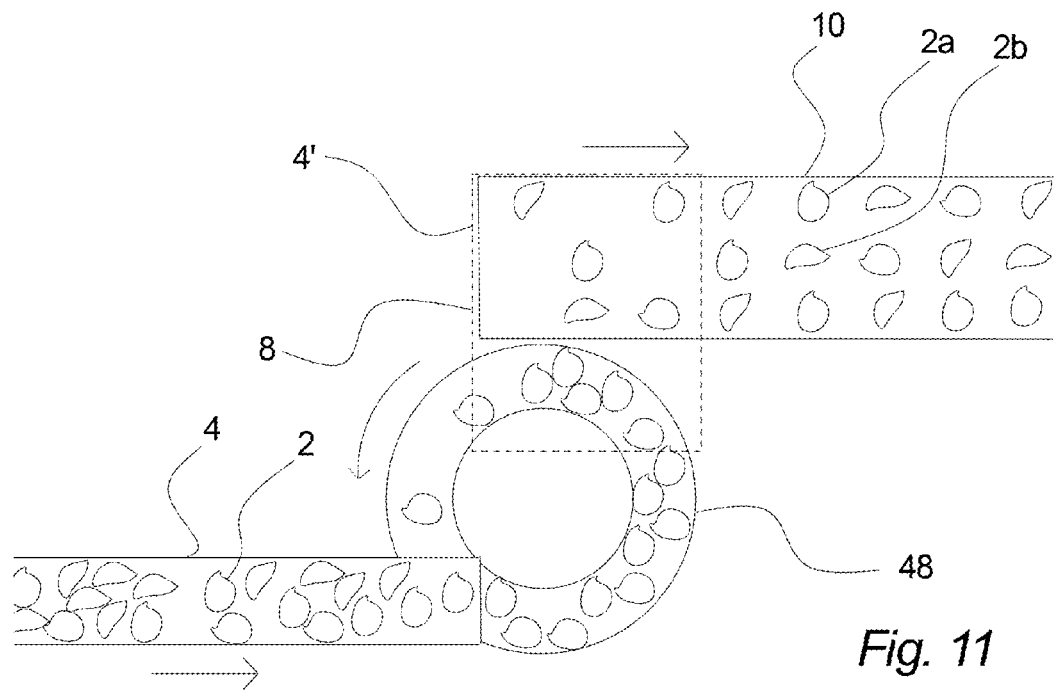
Figure 12:
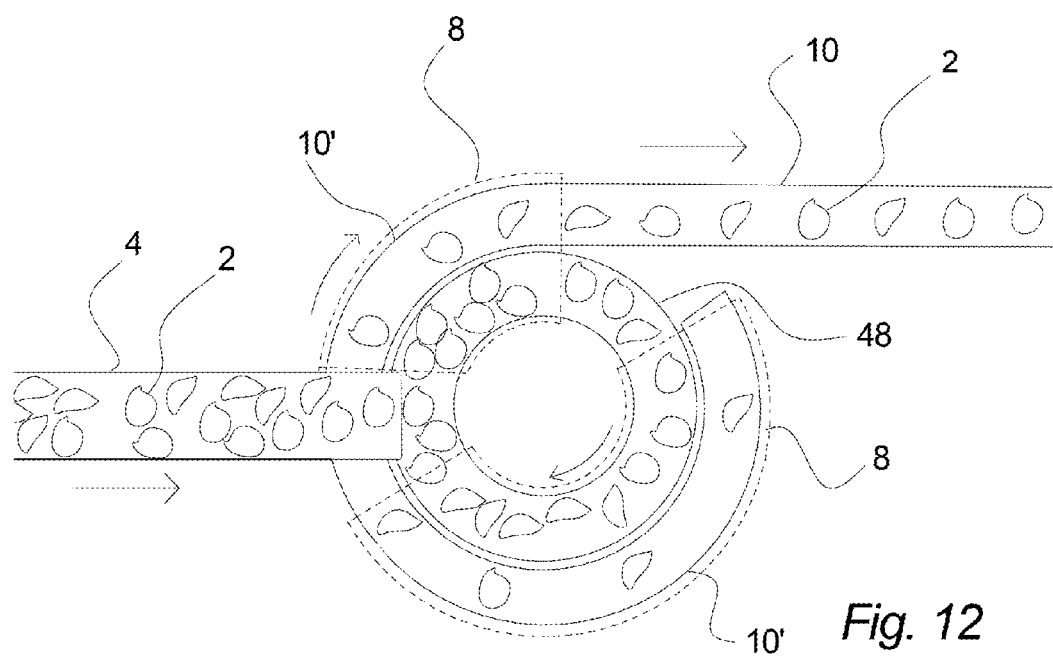

The invention will be explained in further detail below with reference to the figures of which FIG. 1 illustrates the use of the method and the system according to an embodiment of the invention for transferring items from one conveyor belt to another, FIG. 2 illustrates correspondingly the use of the method and the system according to another embodiment of the invention for transferring items from one conveyor belt to another, on which the items are arranged in a plurality of rows, FIG. 3 shows an arrangement corresponding to FIG. 1, but showing a design according to a further embodiment of the invention, FIG. 4 shows an arrangement corresponding to FIG. 2, but showing a design according to a further embodiment of the invention, FIGS. 5a-5d show in side views various embodiments of gripping means according to the invention, FIG. 6 shows in a perspective and partly sectional view a still further embodiment of a gripping carrier according to the invention, FIGS. 7a-7h show sequential steps performed by the embodiment shown in FIG. 6, FIG. 8a-8d show side views of various configurations of a transfer device in accordance with the invention, FIGS. 9 and 10 show in sectional views details of a suction device according to different embodiments of the invention, and FIGS. 11 and 12 show further embodiments of the layout of the transport means including e.g. feeding and outlet conveyors in accordance with the invention.

DETAILED DESCRIPTION

FIG. 1 shows seen from above and in a schematic form a conveyor belt 4, by means of which items 2, for example food items such as pieces of meat, e.g. pieces of meat from beeves or calves, lamb, poultry, fish, or other items, such as it will be apparent to a skilled person, are transported in an un-orderly flow such as illustrated. As shown, the individual items 2 can be placed differently in the transverse direction of the conveyor belt and the items can also be placed with different mutual distances, including different mutual distances in the transport direction. The items 2 can even be placed in such a manner that they are overlapping each other or lying on top of each other. Furthermore, the individual items 2 can be placed on the conveyor belt without being orientated in a homogenous manner. This is even more the case, if the items are distinctly shaped, for example having an oblong or oval form.

In an operative area 8 for the invention, which will be described in further detail in the following, the individual items 2 are moved from the conveyor 4 by means of a gripping means and transferred to e.g. another conveyor belt 10 as shown, where the individual items are released on the conveyor belt. The gripping means may for example grip, catch, engage, pinch, grasp, seize, hold or in an analogous manner grip and hold the individual items. In the following this will be referred to in general with the terms "grip" or "engage", but it will be understood that these terms not will limit the manner in which items in accordance with the invention may be contacted or engaged and held until released by means of the gripping means in connection with the present invention. As it is shown in FIG. 1 the individual items can be gripped within a certain extent 4' of the conveyor belt, meaning that the items 2 are not necessarily gripped as they enter the area 4' and not necessarily in the order in which they enter the operative area 8, lying on the conveyor belt 4. As shown in FIG. 1, the individual items may be transported until near the end of the operative area, before they are engaged by gripping means, controlled by a general control system. Similarly, the items 2 can be released on different places or positions of the other conveyor belt 10 within an extent 10', again controlled by a general control system, and whereby it is achieved that the individual items 2 are transported on the conveyor belt 10 in an orderly form. Such an orderly form may for example be a form with a predefined mutual distance, e.g. an equidistant placing of the items, with the items placed in a predefined pattern, with a specified location in relation to the transverse direction of the belt and/or a placing of the items with a specific orientation.

It is noted that the two belts 2 and 10 may have different speeds, for example with the conveyor belt 10 being driven at a considerably higher speed in order to be able to transport the number of items that is being led to the operative area 8 by the conveyor belt 2. Hereby, a desired minimum distance between items 2 on the belt 10 can also be achieved, even when the items 2 are released in fast sequence, e.g. with a relatively small distance in time and at essentially the same location, since the conveyor belt 10 will be moved a certain distance during this period of time.

Furthermore, it is shown in FIG. 1 that means 46 for returning items 2 that has not been gripped when they reach the end of the extent 4' may be provided. Such means 46 may for example as shown with dash-lines be a conveyor that is placed in extension of the conveyor belt 4 and which forms a loop returning possible items to the conveyor belt 4 again prior to the operative area 8. Other means of achieving such functionality may be used, which will be apparent to a skilled person.

In FIG. 2 a similar arrangement is shown, but where it is shown that in accordance with the invention items 2 can be transferred to a conveyor belt 10 in such a manner that the orderly form of the items 2 on the belt 10 also may comprise a placing of the items in a number of parallel rows as indicated by the items 2a, 2b and 2c. Possibly, the items 2 may also be placed at least substantially in alignment with each other in the transverse direction of the belt 10 as shown in FIG. 2. It will be understood that in connection with such an embodiment, the operative area 8 relating to the belt 10, i.e. the extent or area 10', will also extend in the transverse direction of the conveyor belt 10. Items 2 may thus be released on different positions in the transport direction of the belt 10 as well as on different positions in the transverse direction, controlled by a control system, and in such a manner that a desired order or pattern of the items is achieved when the items leave the operative area 8. As illustrated in FIG. 2 such an arrangement may for example be used when feeding items 2 to a freezing machine 12, e.g. a quick freezing machine, or the like.

It will be apparent to a skilled person that in connection with the arrangement shown in FIG. 1 as well as the arrangement shown in FIG. 2 the two conveyor belts may be moved in different directions as well as in the same direction and that further the two belts may be arranged in angled form, i.e. forming an angle different from 0° in relation to each other. Similarly, it will be understood that the items 2 may be fed by means of two or more conveyor belts or similar transport means instead of a single conveyor belt 4. It will also be understood that the items can be transported further on by means of two or more conveyor belts or similar transport means instead of a single conveyor belt 10.

It is apparent that the embodiment shown in FIG. 2 may also be provided with an arrangement for re-circulating items that have not been gripped when they cross the end of the operative area 8. Such an arrangement 46 is illustrated in a schematic manner only in FIG. 2.

As mentioned above, the individual items are gripped, caught or the like by means of gripping means that may be designed in various manners, as suctions means, pinching means, grasping means, etc., but in accordance with the invention a plurality of these gripping means are used for transferring the items.

One or more of these gripping means may be placed on or at a common unit referred to as a gripping carrier, and furthermore the system according to embodiments of the invention may comprise one or more of such gripping carriers, which is illustrated in FIG. 3. This figure corresponds to FIG. 1, but further a gripping machinery 14 according to the invention is illustrated, which gripping machinery 14 is adapted for operating within the abovementioned operative area 8. In the shown example the gripping machinery comprises two gripping carriers 16a and 16b, each one being equipped with two gripping means 18 as schematically shown, which gripping means 18 as mentioned and as indicated each may grip an item 2. The carrier means 16a and 16b may be arranged to be linearly movable in relation to the gripping machinery 14, for example in the transverse direction of the conveyor belts 2 and 10, but they may also be arranged to be movable in other manners. Preferably, the two carrier means will be designed and controlled in such a manner that they are independently movably, for example in consideration of the items 2 available for picking at the area 4' and the location of these items. Furthermore, each of the gripping means 18 on each of the gripping carriers 16a or 16b may be arranged to be activated individually, for example when contacting an item (or vice versa), in which case for example suction may be established to withhold the item, when gripping means of the suction type is used.

As characterized in the claims, at least two gripping means 18 are involved in the method and the system according to the invention. However, these at least two gripping means 18 may be provided in various forms and configurations. For example, as mentioned above, a gripping machinery 14 may comprise a single carrier means 16a or 16b only (in which case this will have two or more gripping means), but more than two carrier means may also be involved, for example three, four etc. Furthermore, it is noted that each gripping carrier 16a or 16b may be designed with a single gripping means 18 only, but that two may be arranged as shown in FIG. 3 or even more, for example three, four etc. on or at each gripping carrier.

It is apparent that the embodiment shown in FIG. 3 may also be provided with an arrangement for re-circulating items that have not been gripped when they cross the end of the operative area 8. Such an arrangement 46 is illustrated in a schematic manner only in FIG. 3. Furthermore, the same will apply for the embodiment, which will be described in further detail below with reference to FIG. 4.

A further embodiment of the invention is illustrated in FIG. 4, which shows an arrangement corresponding to the arrangement shown in FIG. 2. In FIG. 4, however, the gripping machinery is designed in such a manner that a number of gripping carriers, of which three are shown, i.e. 16a-16c, can be moved in a circular form or a similar form as shown with the arrow. These gripping carriers 16a-16c may be designed in correspondence with what has been described above and as it can be seen the operative area 8 can be covered with such an arrangement. Possibly, the gripping carriers 16a-16c may be arranged in such a manner that they will also be movable in relation to the circular form, for example radially movable and/or turnable, whereby the items can be gripped and/or released selectively with great precision, e.g. as regards position and possibly orientation, efficiency and/or speediness.

As is the case for the other embodiments, the embodiment shown in FIG. 4 may comprise two or more gripping means 18, which may be carried by carriers 16, e.g. one carrier 16 having two gripping means 18, two carriers each having one gripping means etc. As for the other embodiments, the number of gripping means and/or number of carriers are specified in view of the desired capacity, the item feeding speed or other specific parameters, whereby the specific needs can be met without increasing the operative speed of the individual gripping means.

As mentioned above, the gripping means 18 may use various means for gripping the items, but when suction means are used, the suction effect may for example be achieved using an external vacuum source such as a suction pump, from which vacuum is led to the individual gripping means using e.g. tubes and/or pipe connections.

According to a specific advantageous embodiment of the invention the suction effect is achieved by locally providing the necessary suction effect, for example at each of the gripping means or carrier means. Hereby, tubes and pipe connections are avoided and it will not be necessary to provide e.g. valve control or the like in order to control the suction effect.

As shown in FIG. 5a, which shows a gripping carrier 16 seen from the side and in schematic form, such a gripping carrier 16 may comprise a number of gripping means 18, for example four as shown, that may be designed or controlled to selectively or simultaneously provide a suction effect, by means of which an item can be held to an opening 20 in the gripping means 18. As mentioned above, this may be accomplished by use of an external vacuum source, but as shown in FIGS. 5b, 5c and 5d, which show a gripping carrier 16 corresponding to the gripping carrier shown in FIG. 5a, this may also take place using a suction effect that is created locally, preferably on or at the gripping carrier. This may for example be effected when the gripping means comprise a cavity with a variable volume.

In FIG. 5b the gripping means 18 are shown each with a piston 22, which can be moved by means of a connecting rod 24 or the like, whereby the piston can be moved in the cavity in the gripping means. The pistons 22 can be moved simultaneously, for example in case they are mechanically connected, or they may be moved individually, e.g. not necessarily in complete synchronism and not necessarily with the same end positions, e.g. the same upper position. When an item contacts a gripping means 18, the piston can be moved from a lower position to an upper position, whereby a vacuum is created to hold the item. The piston can be moved to an upper position or it can be controlled to be moved to a position, where a vacuum has been created which suffices to withhold the item.

As shown in FIGS. 5a and 5b, the opening 20 of the suction gripping means 18 may be provided with means for enhancing the connection between an item and the gripping means 18, when suction is provided, for example in the form of a ring-shaped member, but further, the opening 20 may be provided with a certain degree of flexibility, e.g. using a member made from a flexible material such as rubber or the like. Even further, the part of the gripping means 18 may be shaped in order to provide flexibility, for example as shown in FIG. 5c, where the opening is in the form of a bellow 20', that also provides the advantage that surface irregularities on an engaged item will be compensated for. Further, when two or more gripping means 18 are used together as shown in FIGS. 5a-5d, differences in thickness between items—or differences in the height of the contacted surfaces, for example when items are overlapping each other—will be compensated for with such an arrangement.

As shown in FIG. 5d, the gripping means 18 as such may also be designed as bellows or similar means for providing the suction effect. For example, a gripping means 18 may, when it is not holding an item, be in a state as shown at 18'. When an item is contacted, the bellow is stretched, for example by means of a spring force or other mechanical means, whereby a vacuum is produced for engaging and holding the item. According to a preferable embodiment, though, the bellow is in its extended shape, before an item is contacted. When an item is contacted by the opening 20, the gripping carrier 16 is moved further downwards, while air is allowed to escape from inside the bellow, for example via e.g. a one-way valve or the like (not shown in FIG. 5d). When the bellow has been compressed a suitable amount, the gripping carrier 16 is lifted upwards and the bellow will be extended, e.g. due to the urge to move back to the rest state, and an initial vacuum will be created, which serves to withhold the item. Since the weight of the item will stretch the bellow further, a vacuum will be created which will serve to grip the item securely. When the item has been transferred to the destined position, the vacuum is released, for example by opening a valve or the like, whereby the item will be released.

Other manners of providing a vacuum effect locally are possible, which will be apparent to a skilled person.

An example of a design of a device according to a further embodiment of the invention is shown in FIG. 6 in a perspective view and with certain parts shown in a sectional view. Here, a conveyor belt 4 is shown, by means of which the items 2 are delivered to the device. It is noted that the items 2 may be delivered in an un-orderly form and not necessarily in the form indicated in FIG. 8, where for the sake of clarity the items 2 are shown being delivered not overlapping each other and with essentially the same orientation. The items are transferred to the conveyor belt 10 by means of a gripping carrier 16 and a carriage 34. As shown the conveyor belts 4 and 10 may be moved in separate directions, but it is apparent that they may be moved in the same direction and that they further may form an angle in relation to each other as also mentioned above. The gripping carrier 16 according to the shown embodiment comprises three gripping means 18, which are actuated simultaneously. The three pistons 22, which are movable in cylinder parts 19, are connected by means of piston rods 31 and possibly via spring elements to a shared piston control mechanism 30. This shared piston control mechanism 30 serves to move the pistons 22 in the vertical direction in relation to the frame part 17 of the device 16. The cylinder parts 19 are also connected to and carried by a shared bracket 32, which is connected to the frame part 17 via two rods 33, corresponding actuators 38 and possibly spring elements, the function of which will be described later on. Thus, the cylinder parts 19 can also be moved up and down in relation to the frame 17. Thus, it will be understood that the cylinder parts 19 and the pistons 22 are independently movable in relation to the frame 17, the cylinder parts 19 controlled by the rods 33 and the actuators 38 and the pistons 22 controlled by the shared piston control mechanism 30.

It is obvious that more or less than three gripping means 18 may be comprised in or at such a gripping carrier 16.

Further, in FIG. 6 a carriage 34 is shown, which is laterally movable and which cooperates with a scraper device 36 comprising a number of scrapers 37, as it will be explained below.

The function of the device shown in FIG. 6 will now be described in further detail with additional reference to FIGS. 7a-7h, which illustrate the sequential steps of the device. For the sake of clarity, only few parts are indicated with reference numbers in FIGS. 9a-9h, which as regards the construction of the device correspond essentially identically to the detailed FIG. 6.

As illustrated in FIG. 7a, the gripping means 18 can be moved down towards the items 2 controlled by the shared piston control mechanism 30 and the shared bracket 32, which both are pushed downwards in relation to the frame 17. Thus, the pistons 22 will be at the bottom of the cylinder parts 19 (cf. FIG. 6) and the cylinder parts 19 will contact the items 2.

When as illustrated in FIG. 7b the shared piston control mechanism 30 is being moved upwards, while the cylinder parts 19 controlled by the shared bracket 32 are kept in contact with the items 2, vacuum is created to withhold the items. The pistons 22 are moved upward to a position, possibly an upper limit position, where the vacuum is sufficient to lift the items 2.

Now, as shown in FIG. 7c, the pistons 22 as well as the cylinder parts 19 are lifted by means of the shared piston control mechanism 30 and the shared bracket 32, respectively, meaning that the gripping means 18 holding the engaged items are lifted upwards.

As shown in FIG. 7d, the carriage 34 has now been slid under the items engaged by the gripping means 18, and as shown in FIG. 7e the shared piston control mechanism 30 is moved downwards in relation to the cylinder parts 19, whereby the items are released onto the carriage 34.

The carriage 34 is now returned as shown in FIG. 7f, where it is shown that the scrapers 37 of the scraper device 36 engage the items on the carriage 34. When the carriage 34 continues its return movement as shown in FIG. 7g, the scrapers 37 will cause the items to be pushed down from the carriage 34 and onto the conveyor belt 10, for example in the order, in which they were placed on the carriage 34. This is shown in FIG. 7h, and it is also shown the pistons 22 and the cylinder parts 19, controlled by the shared piston control mechanism 30 and the shared bracket 32, respectively, have not been moved during the return movement of the carriage 34. The pistons 22 are thus situated at the bottom of the cylinder parts 19, ready to be moved downwards simultaneously, thus reaching the step illustrated in FIG. 7a, where after the cycle is repeated.

As indicated in FIGS. 7a-7h, the carriage 34 may be moving in an essentially continuous cycle, e.g. moving continuously, apart from the end positions, but it is apparent that the carriage may be moving in steps with pauses between (some of) the steps. The same will apply for the other moving parts shown in FIG. 6.

As shown in FIG. 6, flexible and/or spring elements may be arranged between the individual mechanical parts of this gripping device, for example between the pistons 22 and the piston rods 31 and further at the suspension of the bracket 32, e.g. between the bracket 32 and the rods 33. Hereby, an improved contact with the individual items is achieved while simultaneously ensuring that the items are not subjected to an unacceptable force or impact, for example in case one item is thicker than the others or in case an item is overlapping another. It will be understood that the individual gripping means 18 also can be arranged with a mutual flexibility, thus achieving that items with varying thickness can be handled. Further, it is noted that the embodiment of the gripping carrier 16 shown in FIG. 6 may be used without a carriage 34 or another corresponding item transport means when the gripping carrier 16 is designed in such a manner that it can be moved laterally before the items 2 are released. Furthermore, the gripping carrier 16 may comprise a plurality of separate gripping means 18 or groups of gripping means 18.

Furthermore, it will be apparent to a skilled person that the embodiment shown in FIGS. 6 and 7a-7h may be provided with means for enhancing the contact between an item and a gripping means 18, for example flexible members, bellows or the like as described above in connection with FIGS. 5a-5c.

Various other manners of designing the gripping device are possible within the scope of the claims, which will be apparent to a skilled person within the field.

It will be understood that an arrangement as shown in FIGS. 6 and 7a-7h may be used in connection with the systems shown in e.g. FIGS. 1 and 2, where items 2 are delivered by the conveyor 4, transferred to the conveyor 10, where they are arranged in an orderly flow. Thus, it will be understood that an arrangement essentially as shown in FIG. 6 is placed in the system corresponding to the operative area 8 shown in FIGS. 1 and 2. For example, an arrangement as shown in FIG. 6 may readily be used for the system shown in FIG. 1, cf. also FIGS. 7a-7h. Furthermore, it will be understood that two or more of the arrangements shown in FIG. 6 may be used in connection with the system shown in FIG. 1, for example placed next to each other in the longitudinal direction of the conveyors, whereby the total item transfer speed can be increased without increasing the speed of the individual transfer arrangements.

It will also be understood that the transfer arrangement as shown in FIG. 6 can be adapted for delivering the items in two or more rows and can thus be used in connection with a system as shown in FIG. 2. For example, the carriage 34 may be provided with an increased length, whereby the items may be located selectively on the carriage 34 not only as regards the lateral position, but also as regards the position in the longitudinal direction of the carriage. It is apparent that this requires a longer stroke of the carriage 34. Further, a modified arrangement of the scrapers 37 is also required, where the individual scrapers are placed in positions, corresponding to the positions, in which it is desired to transfer the items to the conveyor 10.

When using a method and a system as described above, it is apparent that the conveyor belt 10 is advanced with a speed corresponding to the item delivery speed of the transfer device, e.g. whereby the conveyor belt 10 has moved a distance corresponding to three items placed in an orderly form each time an operative cycle has been performed by the transfer arrangement as shown in FIG. 6.

Also, the items can readily be delivered in a plurality of rows using a transfer arrangement as shown in FIG. 6, when the conveyor belt 10 in the system shown in FIG. 2 is arranged to move in a direction essentially perpendicular to the direction of the feeding conveyor 4, e.g. in the downward direction in FIG. 2. It will thus be seen that a transfer arrangement as shown in FIG. 6 located at the operative area 8 will deliver the items in three parallel rows on the conveyor 10. A further transfer arrangement as shown in FIG. 6 placed next to the first one will result in six rows of items being delivered in an orderly form to the conveyor 10, etc., whereby again the total item transfer speed can be increased without increasing the speed of the individual transfer arrangements. It is noted that a transfer arrangement as shown in FIG. 6 may be designed with another number of gripping means than the three shown in FIG. 6 and a corresponding number of positions on the carriage 34, whereby items instead can be delivered in e.g. two, four, five rows etc. and a multiple hereof, which will be apparent to a skilled person.

Further configurations will be possible, which will be apparent to the skilled person.

In order to further illustrate the various options for arranging the transfer of the items in accordance with the invention, FIGS. 8a-8d show in side views various configurations of certain elements of a transfer device in accordance with the invention.

Thus, FIG. 8a shows in a schematic and general manner a section of a feeding conveyor 4 and a section of an outlet conveyor 10. A gripping means 18 is shown seen from the side, placed above an item 2, which is located on the feeding conveyor 4. As indicated with arrows a and b, the gripping means 18 is designed in such a manner that it can be moved down towards the item 2 in order to engage it and upwards again. Further, it can be moved laterally in order to release the item on the outlet conveyor 10. It will be understood, though, that the gripping means 18 need not move rectilinearly as strictly indicated by the arrows, but may follow e.g. curved routes.

As also explained above, the number of gripping means 18 will be at least two, and where a plurality of gripping means are used, the total item transfer speed can be increased without increasing the speed of e.g. the individual gripping means. Thus, the specific needs, e.g. the item delivery speed, capacity etc. can be served using a number of gripping means 18, which is determined in view of the particular circumstances and without e.g. trying to adapt the individual gripping means in order to increase the individual working capacity and speed. Similar applies for the embodiments, which will be described in the following with reference to FIGS. 8b-8d.

In FIG. 8b a corresponding arrangement is shown, but here the gripping means 18 is adapted for being located in an essentially fixed horizontal level. Instead, the conveyor 4 is able to move vertically as indicated by the arrow a', whereby an item can be engaged by the gripping means 18. When an item has been engaged, the gripping means 18 can be moved in the horizontal direction as indicated by the arrow b in order to release the item above or on the conveyor 10.

A further embodiment is shown in FIG. 8c, where a carriage 34 is used as well. As indicated, an item can be engaged by the gripping means 18 when this is moved down towards the conveyor 4 or possibly when the conveyor 4 is moved upwards. When an item has been engaged, the carriage can be moved as indicated by the arrow b' to a position underneath the item engaged by the gripping means 18 and the item is released, preferably in a predetermined position on the carriage 34. The carriage 34 is moved towards the conveyor 10, where the item is placed in accordance with the order, in which items are conveyed on the conveyor 10. It will be understood that the carriage 34 may transfer one item at a time or it may transfer more items simultaneously, for example if the gripping means 18 is part of a group of gripping means. Further, it will be understood that the item or items may be transferred from the carriage 34 to the conveyor 10 by means of a scraper as explained above in connection with FIG. 6, by having the carriage or part hereof tilt or in any other suitable manner.

A still further example is shown in FIG. 8d, also comprising a carriage 34. However, this carriage 34 is not movable. The gripping means 18 and the conveyor 4 may be arranged as explained above in connection with FIG. 8c, e.g. either one may be movable in the vertical direction in order to engage items. When an item has been engaged by the gripping means 18, it is moved in the horizontal direction to a position above the carriage, where the item is released, for example in a predetermined position. From the carriage an item or a plurality of items can be transferred to the conveyor 10, e.g. one at a time or two or more simultaneously, in such a manner that the desired order is achieved on the conveyor 10. The items may be transferred from the carriage by means of a scraper, by means of tilting, for example by selectively tilting certain parts of the carriage etc.

It will be understood that other configurations are possible. It will also be understood that other means than conveyor belts may be used as feeding and outlet means. Also, it will be understood that the items may be delivered to a static support, from which the items are gripped, instead of a conveyor belt. Furthermore, it is noted that a number of gripping means 18 may be operating simultaneously, independent or dependent on each other. Further, groups of gripping means 18 may be used, operating in a fixed relationship, for example mechanically connected to each other.

Further details of the invention will be explained with reference to FIGS. 9 and 10, where a lower part of a gripping means 18 using vacuum effect is shown in a sectional view according to further expedient embodiments, where a piston is used for producing the necessary vacuum for lifting an item. In FIG. 9 the gripping means 18 is shown with an internal cylindrical cavity, the lower part of which forms an abutting surface for the items. It is further shown that the piston in its lower position 22' possibly may be abutting the item or the piston may, if it is desired, be located with distance to the item. As it will be seen, this embodiment provides the advantage of facilitating an efficient cleaning of the gripping means and its inner parts, which is essential in connection with the handling of food items or the like. The piston 22 may possibly be removed in a simple manner when cleaning the gripping means.

In FIG. 10 a similar design of the lower part of a gripping means 18 is shown. However, at the lower part a mouthpiece 40 is placed, which has an abutting part 42, which in a well-defined manner can contact the item and provide an efficient sealing in order to maintain the vacuum against the item. In order to facilitate the option of effecting an efficient cleaning this mouthpiece 42 is designed as a removable part, whereby the inner cavity can be cleaned as explained above, and whereby the piston 22 possibly can be removed when cleaning the gripping means. The mouthpiece 42 may be connected to the cylinder part itself by means of a threaded connection, by means of a bayonet catch or by other corresponding means, which will be apparent to a skilled person.

Further embodiments of the layout of the transport means including e.g. feeding and outlet conveyors in accordance with the invention will now be described with reference to FIGS. 11 and 12.

As for the embodiments shown in FIGS. 1-4, the items 2 are fed by means of the conveyor belt 4, but as shown in FIGS. 11 and 12, the items are fed, e.g. dropped or pushed onto a rotating, circulating, looping or the like conveyor 48, for example a ring-shaped conveyor belt, a turntable, a carousel or similar means. From here, the items are gripped and transferred essentially in accordance with the principles and the embodiments explained above, to the conveyor belt 10, e.g. using a plurality of gripping means 18 that selectively can place the items 2 on the conveyor belt 10 and which are effective within an operative area 8. However, in contrast to the former embodiments, no re-circulating means are necessary, since the items can remain on the conveyor 48 for subsequent gripping. Thus, the conveyor 48 may serve as a buffer arrangement. Furthermore, a larger operative area can be achieved, which in particular will be seen in FIG. 12, where the curved part 10' of the conveyor belt 10 may extend along the outer (or inner) periphery of the conveyor 48 in order to achieve a suitable or desired operative area 8. As shown in FIG. 12, the operative area 8 may comprise two (or more) separate areas, divided by the inlet conveyor, but it is apparent that these areas may be joined together.

It will be understood that the invention is not limited to the particular examples described above and shown in the drawings, but may be modified in numerous manners within the scope of the invention as specified in the claims.

The invention claimed is:

1. A method of transferring items from a first area where said items are provided in an un-orderly form to a second area from which said items are transferred in an orderly flow of items, said method comprising the step of using a plurality of gripping means for transferring said items, said transferring including the steps of:
    moving at least one of said plurality of gripping means toward at least part of said first area or moving said at least part of said first area toward said at least one of said plurality of gripping means;
    engaging at least one of said items among said items provided in an un-orderly form at said first area using said at least one of said plurality of gripping means;
    moving said at least one item away from said first area or moving said first area away from said at least one item; and
    placing said at least one item at a selected position of said second area, wherein
    said at least one item is moved away from said second area in an orderly flow with at least one additional item handled by another one of said plurality of gripping means, and wherein
    a plurality of gripping carriers are used for transferring said items, each one of said plurality of gripping carriers carrying at least one of said plurality of gripping means, said plurality of gripping carriers being controlled in such a manner that they are independently movable.

2. The method according to claim 1, wherein said at least one item is released and/or placed at a selected position at said second area.

3. The method according to claim 2, wherein said step of releasing and/or placing said at least one item at a selected position comprises locating said at least one item:
    at a position selected among a number of predetermined positions, or
    at a position selected in relation to already located items and/or in relation to positions of other items being transferred.

4. The method according to claim 3, wherein said plurality of gripping means are adapted for, individually or in combination, controllably locating items at a predefined area constituting said second area.

5. The method according to claim 3, wherein
    said at least one of said plurality of gripping means is moved toward said first area or said first area is moved toward said at least one of said plurality of gripping means, and wherein
    said at least one of said gripping means is adapted for engaging said at least one item located within a predefined area comprised in said first area.

6. The method according to claim 5, wherein
    said items are delivered to said first area by transport means, and wherein
    said items are moving at said first area, and further wherein
    an item that is not engaged by one of said plurality of gripping means when passing said first area is returned to said transport means that delivers items to said first area.

7. The method according to claim 6, wherein
    the items that are delivered to said second area are transported further on by transport means, and wherein
    said items delivered to said second area are delivered directly to said transport means for further transport.

8. The method according to claim 1, wherein
    said at least one of said plurality of gripping means is moved toward said first area or said first area is moved toward said at least one of said plurality of gripping means, and wherein
    said at least one of said gripping means is adapted for engaging said at least one item located within a predefined area comprised in said first area.

9. The method according to claim 1, wherein
    said items are delivered to said first area by transport means, and wherein
    said items are moving at said first area, and further wherein
    an item that is not engaged by one of said plurality of gripping means when passing said first area is returned to said transport means that delivers items to said first area.

10. The method according to claim 1, wherein
    the items that are delivered to said second area are transported further on by transport means, and wherein
    said items delivered to said second area are delivered directly to said transport means for further transport.

11. A system for transferring items from a first area where said items are provided in an un-orderly form to a second area, said system being adapted for transferring an orderly flow of items from said second area, said system comprising
    a plurality of gripping means adapted for transferring said items;
    first location means for supporting said items, wherein said items are provided in an un-orderly form at said first area; and
    second location means for supporting said items at said second area, wherein
    said system is adapted for:
        moving at least one of said plurality of gripping means towards at least part of said first area or moving said at least part of said first area toward said at least one of said plurality of gripping means, engaging at least one of said items among said items provided in an un-orderly form at said first area by said at least one of said plurality of gripping means, moving said at least one of said items away from said first area, or moving said first area away from said at least one of said items, and placing said at least one of said items at a selected position of said second area, wherein said at least one of said items is moved away from said second area in an orderly flow with at least one additional of said items engaged by another one of said plurality of gripping means;

wherein said system further comprises a plurality of gripping carriers each one of which carries at least one of said plurality of gripping means, said plurality of gripping carriers being independently controllable.

12. The system according to claim 11, wherein said plurality of gripping means are adapted for, individually or in combination, controllably locating items at a predefined area constituting said second area at said second location means.

13. The system according to claim 12, wherein said predefined area at said first location means constitutes said first area, and wherein said at least one of said plurality of gripping means is adapted for engaging said at least one item located within said predefined area at said first location means.

14. The system according to claim 13, wherein said plurality of gripping means each comprise suction means for engaging and holding said items.

15. System according to claim 13, wherein said plurality of gripping means are each adapted for engaging and holding said items by mechanical means.

16. The system according to claim 13, wherein said first location means form part of inlet transport means for delivering items to said first area with said items being moved at said first area.

17. The system according to claim 11, wherein said first location means comprises transport means forming part of a transport loop, said transport means including a continuous conveyor belt, a circular conveyor belt, a rotating conveyor, and/or a turntable.

18. The system according to claim 11, wherein said plurality of gripping means each comprise suction means for engaging and holding said items.

19. The system according to claim 11, wherein said plurality of gripping means are each adapted for engaging and holding said items by mechanical means including mechanical lifting, mechanical gripping, and/or mechanical pinching.

20. The system according to claim 11, wherein said first location means form part of inlet transport means for delivering items to said first area with said items being moved at said first area.

21. The method of claim 1, wherein said plurality of gripping means are each adapted for engaging and holding said items by mechanical means including mechanical lifting, mechanical gripping, and/or mechanical pinching.

22. The method of claim 1, wherein said items are flaccid having a variable thickness and/or height compared to teach other, and wherein gripping means grips said items by using a vacuum source.

23. The method of claim 1, wherein said plurality of gripping carriers are mounted on a common base and wherein said plurality of gripping carriers are controlled in such a manner that they are independently movable in at least one lateral direction.

24. The method of claim 11, wherein said plurality of gripping carriers are mounted on a common base and wherein said plurality of gripping carriers are controlled in such a manner that they are independently movable in at least one lateral direction.

25. The system of claim 11, wherein said items are flaccid having a variable thickness and/or height compared to teach other, and wherein gripping means grips said items by using a vacuum source.

26. A method of transferring items from a first area where said items are flaccid having an arbitrary thickness and/or height and provided in an un-orderly form to a second area from which said items are transferred in an orderly flow of items, said method comprising the step of using a plurality of gripping means for transferring said items, said transferring including the steps of:

moving at least one of said plurality of gripping means toward at least part of said first area or moving said at least part of said first area toward said at least one of said plurality of gripping means;

engaging at least one of said items among said items provided in an un-orderly form at said first area using said at least one of said plurality of gripping means;

laterally moving said at least one item away from said first area or laterally moving said first area away from said at least one item; and placing said at least one item at a selected position of said second area, wherein said at least one item is moved away from said second area in an orderly flow with at least one additional item handled by another one of said plurality of gripping means, and wherein a plurality of gripping carriers mounted on a common base are used for transferring said items, each one of said plurality of gripping carriers carrying at least one of said plurality of gripping means, said plurality of gripping carriers being controlled in such a manner that they are at least partially independently movable in a lateral direction and adjust to said arbitrary thickness and/or height of said items.

27. The method of claim 26, wherein at least some of said items overlap other of said items, and wherein said gripping means are controlled to compensate for the variable height of said items due to said overlap.

28. The method of claim 26, wherein said gripping means grips said items by mechanically gripping and/or pinching said items.

29. The method of claim 26, wherein said items are flaccid having a variable thickness and/or height compared to each other, and wherein gripping means grips said items by using a vacuum source.

30. The method of claim 26, wherein items that move past said gripping means without being transferred are returned to said first area for an additional attempt at transfer by said gripping means.

31. A method of transferring items from a first area, where said items are provided in an un-orderly form across the width of said first area, to a second area from which said items are transferred in an orderly flow of items, said method comprising the step of using a plurality of gripping means for transferring said items, said transferring including the steps of:

moving at least one of said plurality of gripping means toward at least part of said first area or moving said at least part of said first area toward said at least one of said plurality of gripping means;

engaging at least one of said items among said items provided in an un-orderly form at said first area using said at least one of said plurality of gripping means;

laterally moving said at least one item away from said first area or laterally moving said first area away from said at least one item; and placing said at least one item at a selected position of said second area, wherein said at least one item is moved away from said second area in an orderly flow with at least one additional item handled by another one of said plurality of gripping means, and wherein a plurality of gripping carriers mounted on a common base are used for transferring said items, each one of said plurality of gripping carriers carrying at least one of said plurality of gripping means, said plurality of gripping carriers being controlled in such a manner that they are at least partially independently movable in a lateral direction and adjust to said arbitrary placement of said items across the width of said first area.

32. The method of claim 31, wherein at least some of said items overlap other of said items, and wherein said gripping means are controlled to compensate for said overlap.

33. The method of claim 31, wherein said gripping means grips said items by mechanically gripping and/or pinching said items.

34. The method of claim 31, wherein said items are flaccid, and wherein said gripping means grips said items by using a vacuum source.

35. The method of claim 31, wherein items that move past said gripping means without being transferred are returned to said first area for an additional attempt at transfer by said gripping means.

* * * * *